(12) United States Patent
Schiller

(10) Patent No.: US 12,472,953 B2
(45) Date of Patent: Nov. 18, 2025

(54) DEVICE AND METHOD FOR DETERMINING A LANE CHANGE RECOMMENDATION FOR A VEHICLE

(71) Applicant: Bayerische Motoren Werke Aktiengesellschaft, Munich (DE)

(72) Inventor: Manuel Schiller, Eichstaett (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 43 days.

(21) Appl. No.: 18/752,971

(22) Filed: Jun. 25, 2024

(65) Prior Publication Data

US 2025/0010876 A1   Jan. 9, 2025

(30) Foreign Application Priority Data

Jul. 3, 2023   (DE) .................... 10 2023 117 487.8

(51) Int. Cl.
*B60W 40/04* (2006.01)
*B60W 30/18* (2012.01)
*B60W 50/14* (2020.01)

(52) U.S. Cl.
CPC ...... *B60W 40/04* (2013.01); *B60W 30/18163* (2013.01); *B60W 50/14* (2013.01); *B60W 2050/146* (2013.01); *B60W 2420/403* (2013.01); *B60W 2554/4045* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 9,672,734 B1* | 6/2017 | Ratnasingam ... | G08G 1/096741 |
| 11,333,516 B2* | 5/2022 | Sasaki .................... | G01C 21/36 |
| 12,330,682 B2* | 6/2025 | Willoughby .... | B60W 60/00184 |
| 2020/0209007 A1* | 7/2020 | Sasaki .................... | G01C 21/36 |
| 2024/0217581 A1* | 7/2024 | Peswani ................... | B62D 6/00 |
| 2025/0010876 A1* | 1/2025 | Schiller ................ | B60W 50/14 |

FOREIGN PATENT DOCUMENTS

| | | | | |
|---|---|---|---|---|
| AU | 2017100399 A4 * | 5/2017 | ........... | G08G 1/0133 |
| CN | 105593643 A * | 5/2016 | ........... | B62D 15/021 |
| CN | 112590791 A * | 4/2021 | ...... | B60W 30/18163 |
| CN | 112590791 B * | 3/2022 | ........... | B60W 40/105 |
| CN | 114954468 A * | 8/2022 | ............ | B60W 30/14 |
| CN | 119142342 A * | 12/2024 | ........ | B60W 50/0098 |
| CN | 119239592 A * | 1/2025 | ............ | B60W 40/02 |

(Continued)

OTHER PUBLICATIONS

German-language Search Report issued in German Application No. 10 2023 117 487.8 dated Feb. 15, 2024 with partial English translation (12 pages).

*Primary Examiner* — Kevin R Steckbauer
(74) *Attorney, Agent, or Firm* — Crowell & Moring LLP

(57) ABSTRACT

A device and a method for determining a lane change recommendation for a vehicle are provided. A processing unit determines a lane change recommendation from a first lane to a second lane if the processing unit has determined that the length of a preceding vehicle turning from the first lane into a third lane is longer than the relevant distance between a crossing area and the first lane running in the first direction via a traffic network node.

16 Claims, 8 Drawing Sheets

(56) References Cited

FOREIGN PATENT DOCUMENTS

| | | | | |
|---|---|---|---|---|
| CN | 114954468 B | * | 3/2025 | ............ B60W 30/16 |
| CN | 120356356 A | * | 7/2025 | |
| DE | 10 2017 204 383 A1 | | 9/2018 | |
| DE | 10 2018 222 509 A1 | | 6/2020 | |
| DE | 10 2020 000 692 A1 | | 9/2020 | |
| DE | 10 2020 007 074 A1 | | 2/2021 | |
| DE | 102023117487 A1 | * | 1/2025 | ............ B60W 40/02 |
| JP | 7694340 B2 | * | 6/2025 | ............ B60K 35/50 |
| WO | WO-2024172121 A1 | * | 8/2024 | ............ B60W 40/04 |

* cited by examiner

DEVICE AND METHOD FOR DETERMINING A LANE CHANGE RECOMMENDATION FOR A VEHICLE

CROSS REFERENCE TO RELATED APPLICATION

This application claims priority under 35 U.S.C. § 119 from German Patent Application No. DE 10 2023 117 487.8, filed Jul. 3, 2023, the entire disclosure of which is herein expressly incorporated by reference.

BACKGROUND AND SUMMARY

The invention relates to a device and a method for determining a lane change recommendation for a vehicle, in which it is determined with the aid of a processing unit whether the vehicle is located on a road having at least one first lane extending in a first direction and at least one second lane extending in the first direction. The processing unit furthermore determines whether the first lane has, at a traffic network node located in front of the vehicle in the direction of travel, a lane binding in the first direction and a further second direction on a third lane and whether the vehicle is located on the first or the second lane. Furthermore, the processing unit determines whether the vehicle is to pass the traffic network node in the first direction when it has been determined that the vehicle is located on the first lane. A lane change recommendation is determined starting from preceding vehicles in the area between the vehicle and the traffic network node.

Document DE 10 2020 000 692 A1 discloses a computer-implemented method for controlling a traffic flow for traffic of vehicles guided on a plurality of lanes via a traffic network node. A traffic flow control service is configured and started independently of vehicles on at least one server. Items of information on the direction of travel of the lanes are determined by the traffic flow control service from a digital traffic network map. Vehicle-related specifications on the position and/or navigation and/or to the destination of at least one vehicle are each acquired and transferred to the traffic flow control service by way of at least one backend server connected to the at least one server. Average speeds and/or average travel times for traffic flows related to the direction of travel are determined from the vehicle-related specifications. At least one lane change recommendation is determined and transferred via the at least one backend server to the at least one vehicle such that for the entirety of the traffic flows related to the direction of travel, the vehicle throughput guided via the traffic network node is enlarged in relation to the vehicle throughput without lane change recommendation.

Document DE 10 2020 007 074 A1 discloses a method and a device for determining items of relevant surroundings information for a vehicle on the basis of image data recorded in darkness of a vehicle camera having its recording area directed in front of the vehicle. It is provided that a distinction is made on the basis of recorded image data between vehicle taillights, in particular additional vehicle reversing, position, and/or brake lights, arranged at the top on the rear with respect to a vehicle vertical axis, of preceding vehicles and traffic signals of a traffic signal system, a vehicle contour for classifying at least one preceding vehicle is determined on the basis of the image data, wherein in the case of multiple lanes running in one direction of a roadway section lying in front of the vehicle and in the case of a preceding vehicle classified as a utility vehicle, which is located on a right lane in front of the vehicle, a lane change recommendation is output to a vehicle user of the vehicle.

Document U.S. Pat. No. 9,672,734 B1 discloses a system, a method, and a computer product for determining items of lane information in a road segment in order to control a first vehicle so that the travel time is minimized. According to one embodiment, navigation data of the first vehicle and at least one other vehicle in a road segment are sent via a communication network to a computer server system. The items of lane information can include whether a lane change is necessary, a lane to be avoided, an optimum lane, and a ranking of the drivable lanes in an ascending order of the travel time for the first vehicle to minimize the travel time.

Furthermore, it is known that navigation systems can deliver recommendations in the case of turning possibilities at traffic network nodes, in particular at intersections, about which lane should be taken.

When driving straight ahead on roads having multiple lanes in one direction, it is dependent in particular on the traffic situation which lane will ideally be taken at an intersection. Each lane can have different "obstacles" (such as slow vehicles, vehicles turning off). Waiting time can be saved by a skilled selection of the lane. This selection has to be made by the driver on the basis of his experience; however, for example, his experience may not be sufficiently developed, and the driver may have an inadequately broad information horizon. A system which assists the driver in making a decision with respect to the lane selection when driving straight ahead automatically and for the ego vehicle in an optimized manner does not exist. The selection of one of multiple possible lanes is difficult in particular even for experienced vehicle drivers if one of the lanes, in addition to driving straight ahead, additionally permits and enables turning off in another direction. The delay time occurring on this lane is then dependent to a significant extent on whether there are vehicles turning off and whether they have to stop when turning off.

Proceeding from the known prior art, it is therefore the object of the invention to specify a device and a method for determining a lane change recommendation for a vehicle.

This object is achieved by a device and a method having the features of the claimed invention.

Due to the device according to the claimed invention, a lane change recommendation can be determined at least or only if the length of the preceding vehicle turning off from the first into the third lane is longer than the distance between the crossing area and the first lane running in the first direction beyond the traffic network node. This means that such a preceding vehicle will then still be at least partially on the first lane when turning off and obstruct the following traffic which is not turning off if the crossing area cannot be driven through immediately, i.e., if pedestrians or bicyclists are located on the crossing area, for example. The crossing area for pedestrians is also referred to as a pedestrian crossing and the crossing area for bicyclists is also referred to as a bicycle path crossing. Such crossing areas are often delimited, at least in Germany, by interrupted broad stroke markings, in particular having 25 cm width, 50 cm length, and a gap of 20 cm, or are identified as pedestrian crossings by zebra stripes. There are also combined crossing areas for pedestrians and bicyclists and crossing areas arranged adjacent for pedestrians and bicyclists.

The determination of the information as to whether the vehicle is located on a road having at least one first lane running in a first direction and at least one second lane running in the first direction and whether the first lane, at a traffic node lying in front of the vehicle in the direction of travel, has a lane binding in the first direction and a further second direction on a third lane, can be carried out in particular starting from image data of a camera of the vehicle, which takes pictures of the surroundings of the vehicle, in particular of the area in front of the vehicle. The processing unit then processes the image data accordingly. Alternatively or additionally, this information can also be transferred to the vehicle with the aid of a known infrastructure-to-car communication or car-to-car communication or can be determined from map data of a digital traffic network map, for example, from a navigation system. The third lane is then a lane of a further road into which a vehicle can turn from the first lane.

Furthermore, the processing unit can determine, with the aid of at least one above-described possibility, a direction of travel for each of the lanes and adjacent and/or preceding vehicles, preferably vehicles which are located on the first or second lane adjacent to or in the area between vehicle and traffic network node. The processing unit can also determine, with the aid of the described possibilities, an intention to turn of a preceding vehicle on the first lane into the third lane and its length.

In order to determine whether the vehicle is to pass the traffic network node in the first direction, the processing unit can determine the navigation data of a navigation unit of the vehicle, the activation state of the turn signals of the vehicle and/or, starting from image data of a camera or surroundings data of another surroundings recording unit, the lane of the vehicle.

The determined lane change recommendation can be output via a human-machine interface, preferably via a display unit or an item of speech information to the vehicle driver and/or can be transferred to a further control unit of an assistance system, preferably an assistance system for autonomous driving.

The relevant distance between the first lane and the crossing area, in the case of right hand traffic and an arrangement of the first lane on the right of the second lane, wherein the third lane branches off on the right from the first lane, is the distance between the right roadway edge of the first lane and the crossing area. The relevant distance between the first lane and the crossing area, in the case of right hand traffic and an arrangement of the first lane on the left of the second lane, wherein the third lane branches off on the left from the first lane, is the distance between the left roadway edge of the first lane and the crossing area, if no opposite roadway is present. The relevant distance between the first lane and the crossing area, in the case of right hand traffic and an arrangement of the first lane on the left of the second lane, wherein the third lane branches off on the left from the first lane, is the distance between the left roadway edge of the first lane and the crossing area minus the width of the opposite roadway.

The relevant distance between the first lane and the crossing area, in the case of left hand traffic and an arrangement of the first lane on the left of the second lane, wherein the third lane branches off on the left from the first lane, is the distance between the left roadway edge of the first lane and the crossing area. The relevant distance between the first lane and the crossing area, in the case of left hand traffic and an arrangement of the first lane on the right of the second lane, wherein the third lane branches off on the right from the first lane, is the distance between the right roadway edge of the first lane and the crossing area if no opposite roadway is present. The relevant distance between the first lane and the crossing area, in the case of left hand traffic and an arrangement of the first lane on the right of the second lane, wherein the third lane branches off on the right from the first lane, is the distance between the right roadway edge of the first lane and the crossing area minus the width of the opposite roadway.

It is advantageous if the device comprises at least one surroundings recording unit, which is designed to record at least one item of surroundings information related to the surroundings of the vehicle at least about an area in front of the vehicle in the direction of travel of the vehicle, i.e., about an upcoming roadway section, and to generate surroundings data corresponding to the surroundings information, wherein the processing unit is designed to process the surroundings data. The surroundings recording unit can in particular comprise a camera, a lidar system, and/or a radar system. In particular, a vehicle preceding the vehicle on the first lane is recorded and its intention to turn is determined. The intention to turn can be determined, for example, in the case of activated turn signals of the preceding vehicle. The information about activated turn signals can also be produced with the aid of pictures taken of the surroundings of the vehicle, in particular of the area in front of the vehicle. The processing unit then processes the image data accordingly. Alternatively or additionally, this information can also be transferred to the vehicle with the aid of a known infrastructure-to-car communication or car-to-car communication.

Furthermore, it is advantageous if the processing unit is designed to detect, starting from the surroundings data, whether the vehicle is located on the first or the second lane. In this way, the ego position or the current lane of the vehicle (ego vehicle) can be determined and taken into consideration in the determination of the lane change recommendation.

It is also advantageous if the surroundings recording unit is a camera of the vehicle, which takes at least one image having a depiction of the area in front of the vehicle and generates image data corresponding to the image, wherein the processing unit is designed to process the image data. In this way, items of information about the surroundings of the vehicle, in particular about the traffic situation and further vehicles, can be determined easily in a known manner.

It is advantageous if the processing unit determines whether a crossing area for pedestrians and/or bicyclists for crossing the third lane is present at the traffic network node. This can be carried out in particular with the aid of recorded images of the surroundings of the vehicle, in particular of the area in front of the vehicle. The processing unit then processes the image data accordingly. Alternatively or additionally, this information can also be transferred to the vehicle with the aid of a known infrastructure-to-car communication or car-to-car communication or determined from map data of a digital traffic network map. It is particularly advantageous if the processing unit determines whether pedestrians and/or bicyclists are present at the crossing area. In this case, it is advantageous if the processing unit determines whether present pedestrians and/or bicyclists have an intention to cross the third lane (transversely over the third lane). The intention to cross can be determined in particular with the aid of images taken of the surroundings of the vehicle, in particular of the area in front of the vehicle. The processing unit then processes the image data accordingly. Alternatively or additionally, this information can also be transferred to the vehicle with the aid of a known infrastructure-to-car communication or car-to-car communication. The processing unit determines a lane change recommendation from the first lane to the second lane only if pedestrians and/or bicyclists are present at the crossing area with intention to cross and it is determined that the length of a preceding vehicle turning off from the first into the third lane is longer than the distance between the crossing area and the first lane running in the first direction via the traffic network node.

It is also advantageous if the processing unit is designed to determine the expected delay time on the first lane due to a preceding vehicle as the first delay time, if the processing unit is designed to determine the expected delay time due to vehicles on the second lane and to determine the lane change recommendation only if the first delay time is greater than the second delay time. In this way, a lane change recommendation is only determined when a time saving for the vehicle is thus actually possible.

It is advantageous if the processing unit, when determining the first and/or second delay time, determines the type and/or the lane and/or the intention to turn of the determined preceding vehicles and takes them into consideration in the calculation of the respective delay time. In this case, the type and the delay times expected to be caused by the vehicles on the first lane and the second lane are also determined in particular. Unnecessary and inadvisable lane changes can thus be avoided.

It is also advantageous if a traffic signal system present at the traffic network node is detected and it is checked whether at least one preceding vehicle has already come to a standstill at a red signal, wherein then its lane is determined. Alternatively or additionally, the processing unit can determine the speeds of preceding vehicles on the at least two lanes, wherein the processing unit takes into consideration the determined stationary vehicle or vehicles and/or the determined speeds of the preceding vehicles when determining the first delay time and/or the second delay time. Unnecessary and inadvisable lane changes can be avoided in this way.

The processing unit can also determine an intention to turn of each preceding vehicle on the first lane into the third lane and only determine the length of the vehicle having intention to turn if only one vehicle having intention to turn has been determined. In the case of multiple vehicles having an intention to turn, a longer delay time is to be expected at least if pedestrians and/or bicyclists cross the crossing area. A lane change recommendation can then also be determined and/or output without further analysis of the length of the turning vehicle and the distance of the crossing area from the first lane.

It is also advantageous if the processing unit for determining the length determines the type of the preceding vehicle and preferably determines whether objects extending the length of the vehicle are present. Such objects extending the length of the vehicle are in particular bicycle racks, protruding cargo, and/or trailers.

It is advantageous if the first lane is the right lane and the third lane branches off to the right at the traffic network node, wherein the second lane runs on the left adjacent to the first lane. The processing unit then determines the distance between the right lane edge of the first lane and the crossing area. Alternatively, the first lane can be the left lane and the third lane can branch off to the left at the traffic network node, wherein the second lane runs on the right adjacent to the first lane. The processing unit then determines the distance between the left lane edge of the opposite roadway and the crossing area.

The processing unit can also determine whether an oncoming vehicle is present on a lane of the opposite roadway and/or a traffic signal system at the traffic network node has the same signals for the first and second lane and for lanes directed in opposite directions, wherein the distance between the left edge of the left lane and the crossing area is only determined if no oncoming vehicle has been determined or if the traffic signal system at the traffic network node has different signals for the first and second lane and for lanes directed in opposite directions.

It is also advantageous if the processing unit determines the speed and/or the possible acceleration of at least one further vehicle on the first lane in front of the vehicle or on the second lane in front of and/or next to the vehicle and takes it into consideration in the determination of the lane change recommendation. In particular, the processing unit determines starting therefrom a first delay time for the first lane and a second delay time for the second lane, wherein the processing unit determines a lane change recommendation only if the first delay time is greater than the second delay time. In particular, the processing unit determines the speed, the possible acceleration, and/or the type of other vehicles (passenger vehicle, truck, tractor, sports car). In particular, the processing unit classifies preceding and/or adjacent vehicles. The processing unit preferably also determines whether pedestrians and/or bicyclists are at the pedestrian traffic signal, who presumably want to cross the road.

The method having the features of the claimed invention the same advantages as the claimed device. In particular, the method can be refined by the features of the dependent claims directed to the device and the above-mentioned refinements.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
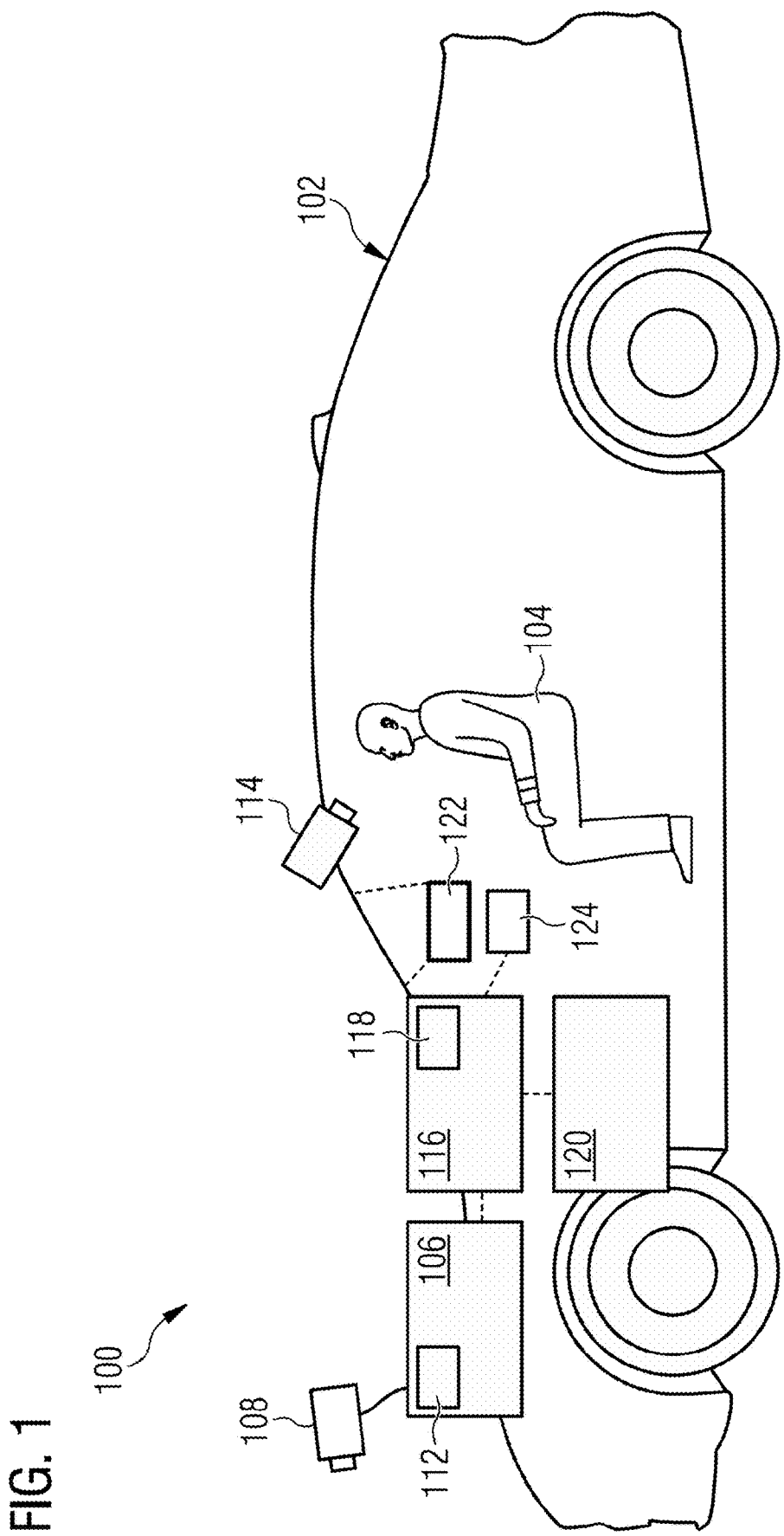
FIG. 1 shows a schematic representation of a device for determining a lane change recommendation for a vehicle.

FIG. 1 shows a schematic representation of a device 100 for determining a lane change recommendation for a vehicle 102. The device 100 monitors at least one area in front of the vehicle 102 both during the non-assisted and during the assisted or autonomous driving of the vehicle 102. For this purpose, the device 100 first determines whether a traffic network node is present in front of the vehicle 102, the present lanes, and the direction of travel of the lanes. The vehicle 102 can both assist a lane change and carry it out autonomously. However, a lane change recommendation can also only be output to a vehicle driver 104.

The device 100 determines objects in the field of view of the vehicle driver 104, in particular elements of the traffic infrastructure, such as traffic signs, traffic signals, and road markings, and other road users, such as pedestrians and bicyclists as well as adjacent, preceding, and oncoming vehicles.

The device 100 comprises for this purpose a surroundings recording unit 106 for recording at least one item of surroundings information related to the surroundings of the vehicle 102. The surroundings recording unit 106 comprises an image recording unit 108, which is designed solely by way of example as a camera. The image recording unit 108 is arranged and designed so as to record an image having a depiction of an area outside the vehicle 102 as the surroundings information and to generate image data corresponding to the image. The recorded image then comprises a depiction of the other road users. The image recording unit 108 can also be designed to record an image sequence made up of chronologically successive images and to generate image data corresponding to the image sequence.

The surroundings recording unit 106 furthermore comprises a navigation unit 112 for recording and/or providing an item of navigation information related to the vehicle 102, for example, a roadmap of the surroundings of the vehicle 102 or the current position of the vehicle 102 in a world coordinate system. The navigation unit 112 generates navigation data corresponding to the navigation information. The surroundings recording unit 106 provides the navigation data, the image data, and/or further data as surroundings data.

The device 100 moreover comprises an occupant recording unit 114 for recording at least one image having a depiction of the vehicle driver 104. The occupant recording unit 114 is designed solely by way of example as an interior camera of the vehicle 102, which is oriented and designed so as to record at least one image having a depiction of the vehicle interior and to generate interior image data corresponding to the image. The occupant recording unit 114 can also be designed to record an image sequence made up of multiple chronologically successive images and to generate interior image data corresponding to the image sequence.

The device 100 furthermore comprises a control unit 116, which is shown solely by way of example as a part of the vehicle 102. The control unit 116 comprises a storage area, in which the control unit 116 can store data and from which the control unit 116 can read stored data. The control unit 116 is furthermore designed to actuate at least the above-mentioned functional units of the device 100 in order to carry out a method for determining a lane change recommendation for the vehicle 102.

The control unit 116 comprises a communication module 118 for wireless data transfer, which is used in particular for car-to-car communication and/or car-to-infrastructure communication. Via this communication, the control unit 116 receives, from the traffic infrastructure and/or other vehicles, items of information both on the traffic infrastructure itself and also about other road users, in particular the route guidance of other vehicles, the speed of other vehicles, and/or the lane change intention of other vehicles.

In the exemplary embodiment shown in FIG. 1, the control unit 116 is moreover designed to actuate a display unit 122 of the vehicle 102. The display unit 122 is de-signed solely by way of example as a head-up display. The control unit 116 can actuate the display unit 122 in order to output the lane change recommendation to the vehicle driver 104. The control unit 116 is furthermore designed according to the exemplary embodiment shown in FIG. 1 to receive an input of the vehicle driver 104 from an input unit 124 of the device 100.

The control unit 116 can determine, with the aid of the items of information provided by the image recording unit 108, the navigation unit 112, and/or by the communication unit 118, whether the first lane has, at a traffic network node lying in front of the vehicle 102 in the direction of travel, a lane binding in the first direction and a further second direction on a third lane. Furthermore, the control unit 116 can determine, with the aid of the items of information provided by the image recording unit 108, the navigation unit, and/or by the communication unit 118, whether the vehicle 102 is located on the first lane or the second lane. The control unit 116 then determines whether the vehicle 102 should pass the traffic network node in the first direction when the vehicle 102 is located on the first lane. This takes place starting from the items of information provided by the navigation unit 120 via a planned route and/or an input of the vehicle driver 104 and/or by an evaluation of the direction of travel indicators (turn signals) of the vehicle 102.

Furthermore, the control unit 116 determines, starting from the items of information provided with the aid of the image recording unit 108, the navigation unit, and/or by the communication unit 118, whether preceding and/or adjacent vehicles are present in the area between the vehicle 102 and the traffic network node and whether a preceding vehicle on the first lane has an intention to turn into the third lane. The control unit 116 then determines the length of the vehicle 102 including attachments and/or cargo extending the vehicle length. The intention to turn is in particular determined by the image recording unit 108 or via the communication unit 118 via a car-to-car communication and/or car-to-infrastructure communication.

The control unit 116 in particular determines a lane change recommendation from the first lane to the second lane when the length of the preceding vehicle turning from the first into the third lane is longer than the relevant distance between the crossing area and the first lane running in the first direction via the traffic network node.

Furthermore, the control unit 116 can determine, starting from the items of information provided with the aid of the image recording unit 108, the navigation unit, and/or by the communication unit 118, whether a crossing area for pedestrians and/or bicyclists for crossing the third lane is present at the traffic network node and whether pedestrians and/or bicyclists are present at the crossing area. In addition, the control unit 116 can only determine the lane change recommendation from the first lane to the second lane if pedestrians and/or bicyclists are present at the crossing area and in particular it is determined that the length of a preceding vehicle turning from the first into the third lane is longer than the relevant distance between the crossing area and the first lane running in the first direction via the traffic network node.

The control unit 116 can additionally or alternatively determine the expected delay time on the first lane by a preceding vehicle as the first delay time and the expected delay time on the second lane. In this case, the control unit 116 only determines the lane change recommendation when the first delay time is greater than the second delay time. When determining the first and/or second delay time, the control unit 116 can determine the type and/or the lane and/or the intention to turn of the determined preceding vehicles and take them into consideration in the calculation of the respective delay time.

The control unit 116 can also determine the presence of a traffic signal system at the traffic network node and check whether at least one preceding vehicle has already come to a standstill at a red signal and determine its lane. Alternatively or additionally, the control unit 116 can determine the speeds of preceding vehicles on the at least two lanes and take into consideration the determined speeds and determined stationary vehicles when determining the first delay time and/or the second delay time.

The control unit 116 can also determine the intention to turn of each preceding vehicle on the first lane into the third lane and only determine the length of the vehicle with intention to turn if only a single vehicle with intention to turn has been determined. In the case of multiple vehicles with intention to turn, in general the distance between crossing area and first lane is not sufficient so that all vehicles fit into this area. The control unit 116 can determine a lane change recommendation in this case without further checking.

In autonomous driving, the control unit 116 transmits the lane change recommendation to a functional unit 120 of the vehicle 102 for autonomous driving, which in particular actuates an actuator, a drive system, a braking system, and/or a steering system. In non-autonomous driving, the control unit 116 outputs the lane change recommendation via an output unit of a human-machine interface to the vehicle driver 104.

Figure 2:
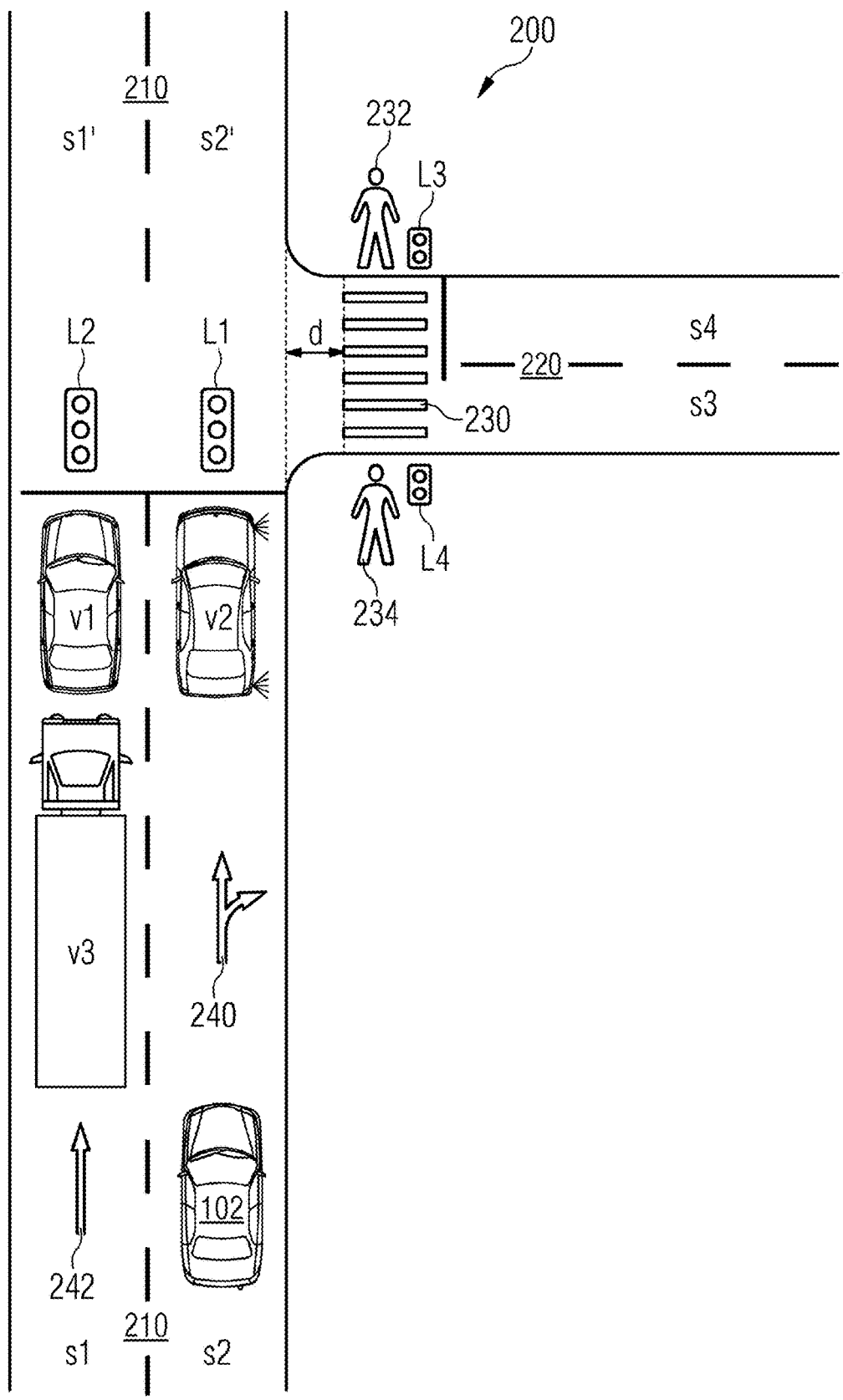
FIG. 2 shows a schematic representation of a first traffic network node having a first traffic situation with the vehicle.

FIG. 2 shows a schematic representation of a first traffic network node 200 having a first traffic situation with the vehicle 102. The traffic network node 200 comprises a roadway 210 having a first straight-ahead lane s1, s1' and a second straight-ahead lane s2; s2'. A side road 220 branches off to the right at the traffic network node 200 and has a third lane s3 and a further fourth lane s4 in the direction of travel opposite to the lane s3. A traffic signal system is at the traffic network node 200 having the traffic signals L1 for the first lane s1, L2 for the second lane s2, L3 and L4 for the crossing area 230 for pedestrians 232, 234. The vehicle 102 (ego vehicle) is located on the first lane s1 and the vehicle v2 is located in front of the vehicle 102. The vehicles v1 and v3 are located on the second lane s2. The distance between the crossing area 230 and the first lane s1 running in the first direction via the traffic network node 200 is designated by d.

Directional arrows 240, 242 on the roadway show the respective permitted directions of travel, i.e., the lane binding. Accordingly, driving straight ahead and turning to the right are permitted on the first lane s1 at traffic network nodes and only driving straight ahead is permitted on the second lane s2.

The traffic signals L1 to L4 are on red in the first traffic situation, so that all present road users 102, v1, v2, v3, 232, 234 have to stop or remain standing. The vehicle v2 standing on the first lane s1 in front of the vehicle 102 signals a right turn so that there is an intention to turn to the right into the third lane s3.

The control unit 116 of the vehicle 102 determines in the traffic situation 200 shown, in particular starting from image data of a camera of the vehicle 102, which takes images of the surroundings of the vehicle 102, in particular of the area in front of the vehicle 102, and generates corresponding image data and transfers these data for processing to the control unit 116, the following:
whether the vehicle 102 is located on a road 210 having at least one first lane s1 running in a first direction and at least one second lane s2 running in the first direction,
whether the first lane s1, at a traffic network node 200 lying in front of the vehicle 102 in the direction of travel, has a lane binding in the first direction and a further second direction on a third lane s3,
whether the vehicle 102 is located on the first lane s1 or on the second lane s2,
whether the vehicle 102 is to pass the traffic network node 200 in the first direction when it has been determined that the vehicle 102 is located on the first lane s1,
whether preceding vehicles and/or adjacent vehicles v1, v2, v3 are present in the area between the vehicle 102 and the traffic node 200,
an intention to turn of a preceding vehicle v2 on the first lane s1 into the third lane s3 and its length, and
a lane change recommendation from the first lane s1 to the second lane s2, if the length of the preceding vehicle v2 turning from the first into the third lane is longer than the relative distance d between the crossing area 230 and the first lane s1 running in the first direction via the traffic network node 200.

Alternatively or additionally to the image data, the control unit 116 can for this purpose also use items of information which are transferred with the aid of a known infra-structure-to-car communication or car-to-car communication to the vehicle 102 or are determined from map data of a digital traffic network map, for example, from the navigation unit 112.

The relevant distance d in the traffic situation according to FIG. 2 is less than the determined length of the vehicle v2 with intention to turn. Furthermore, pedestrians 232, 234 having intention to cross have been determined at the crossing area 230, so that the preceding vehicle v2 blocks the first lane s1 until the pedestrians 232, 234 have left the crossing area 230. The control unit 116 therefore determines a lane change recommendation to change to the lane s2.

Figure 3:
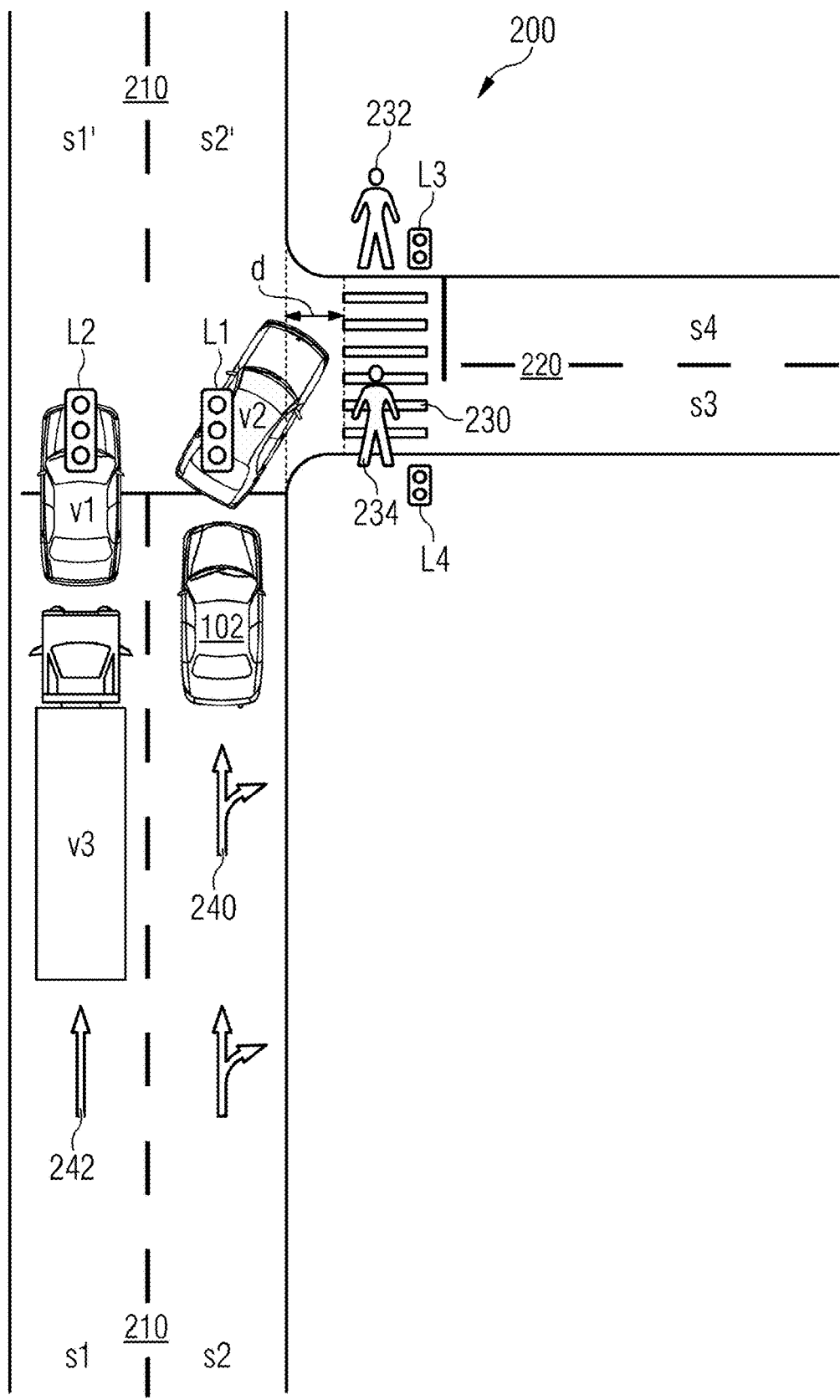
FIG. 3 shows the first traffic network node according to FIG. 2 having a subsequent second traffic situation.

FIG. 3 shows the first traffic network node 200 according to FIG. 2 having a subsequent second traffic situation, in which the traffic signals L1 to L4 are on green, so that all present road users 102, v1, v2, v3, 232, 234 can begin driving or begin walking. The vehicle v2 standing on the first lane s1 in front of the vehicle 102 has turned to the right into the third lane s3. The relevant distance d is not sufficient, however, for the vehicle v2 to completely leave the lane s1, so that following vehicles 102 have to stop and wait until the pedestrians 232, 234 have left the crossing area 230 and the vehicle v2 can drive further on the third lane s3. A second traffic situation subsequent to the first traffic situation according to FIG. 2 is shown in FIG. 3. The vehicle 102 has not carried out a lane change between the first traffic situation and the second traffic situation, although the control unit 116 has output a lane change recommendation to the vehicle driver 104 of the vehicle 102.

Figure 4:
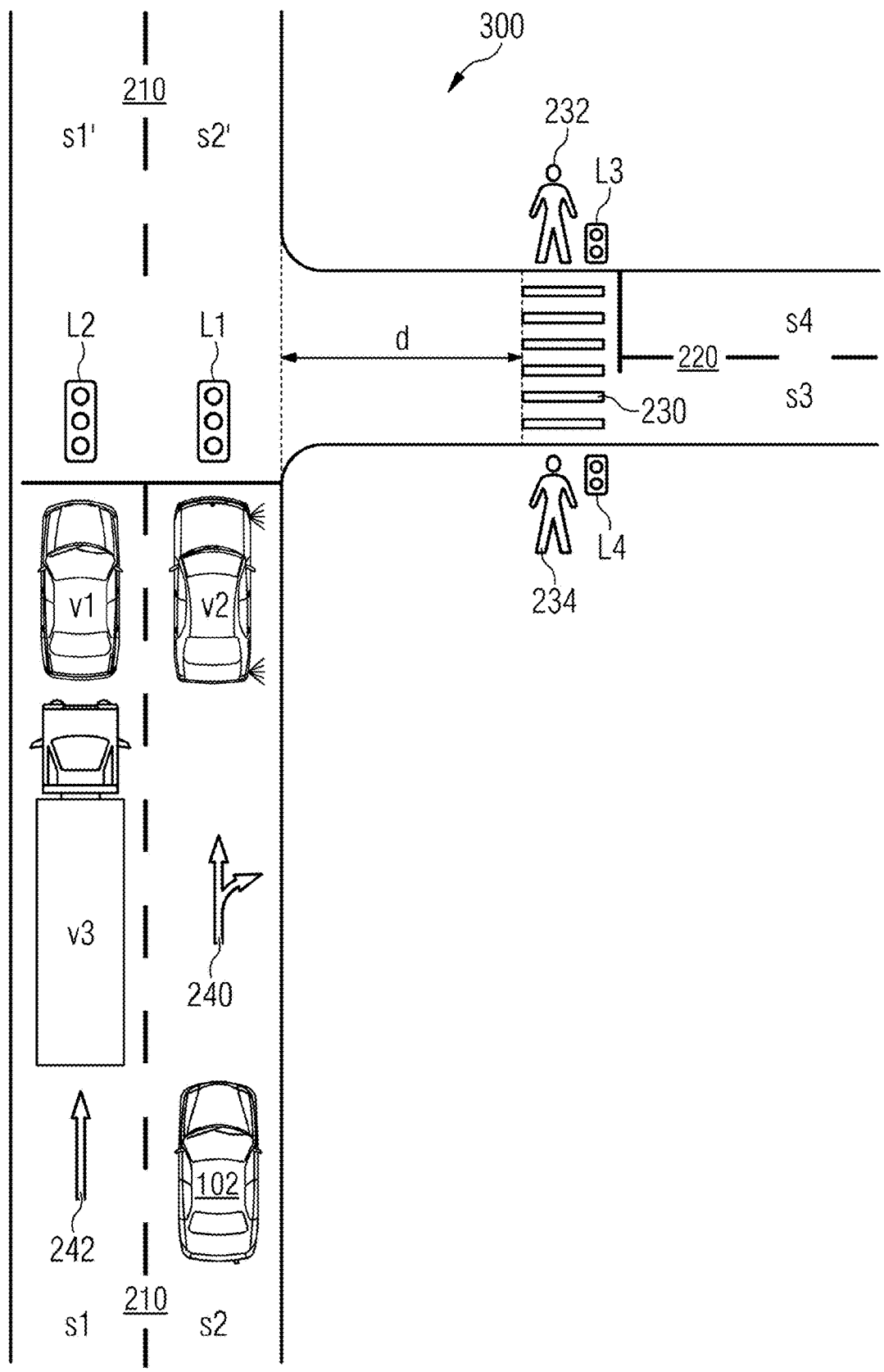
FIG. 4 shows a schematic representation of a second traffic network node having a third traffic situation with the vehicle.

FIG. 4 shows a schematic representation of a second traffic network node 300 having a third traffic situation with the vehicle 102. Identical elements or elements with identical structure and/or identical function have the same reference signs.

The traffic network node 300 differs from the traffic network node 200 in that the relevant distance d between the crossing area 230 and the first lane s1 running in the first direction via the traffic network node 300 is greater than in the traffic network node 200, wherein the length determined by the control unit 116 of the vehicle v2 located on the lane s1 is shorter or less than the relative distance d. The traffic signals L1 to L4 are on red in the third traffic situation, so that all present road users 102, v1, v2, v3, 232, 234 have to stop or remain standing. The vehicle v2 standing on the first lane s1 in front of the vehicle 102 signals a right turn, so that there is an intention to turn to the right into the third lane s3.

Figure 5:
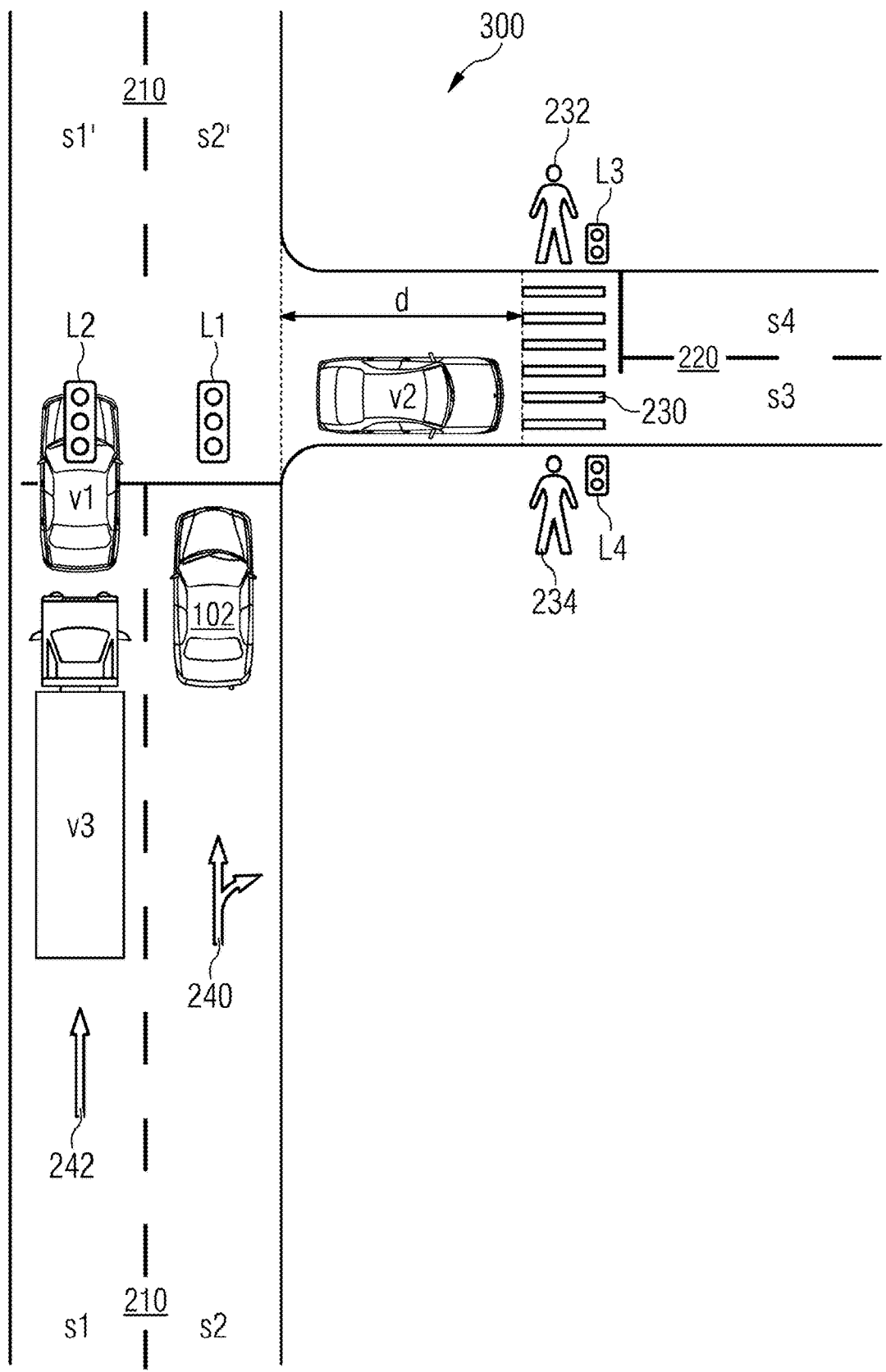
FIG. 5 shows the second traffic network node according to FIG. 4 having a subsequent fourth traffic situation.

However, in contrast to the first traffic situation, the control unit 116 does not determine a lane change recommendation for the vehicle 102, since the vehicle v2, upon a following change of the traffic signals L1 to L4 to green, will turn right into the lane s3 and thus releases the lane s1, s1' even upon a stop before the crossing area 230. Therefore, in contrast to the first and second traffic situation, the lane s1 is already free before the pedestrians 232, 234 have left the crossing area 230 after crossing the road 220 and the vehicle v2 can drive further on the lane s3. This is shown in FIG. 5, in which the second traffic network node 300 according to FIG. 4 is shown having a subsequent fourth traffic situation, in which the vehicle v2 has already turned to the right and stops before the crossing area 230 so that the pedestrians 232, 234 can pass the crossing area 230. The first lane s1, s1' is therefore free in front of the vehicle 102, so that it can pass the traffic network node 300 unobstructed.

Figure 6:
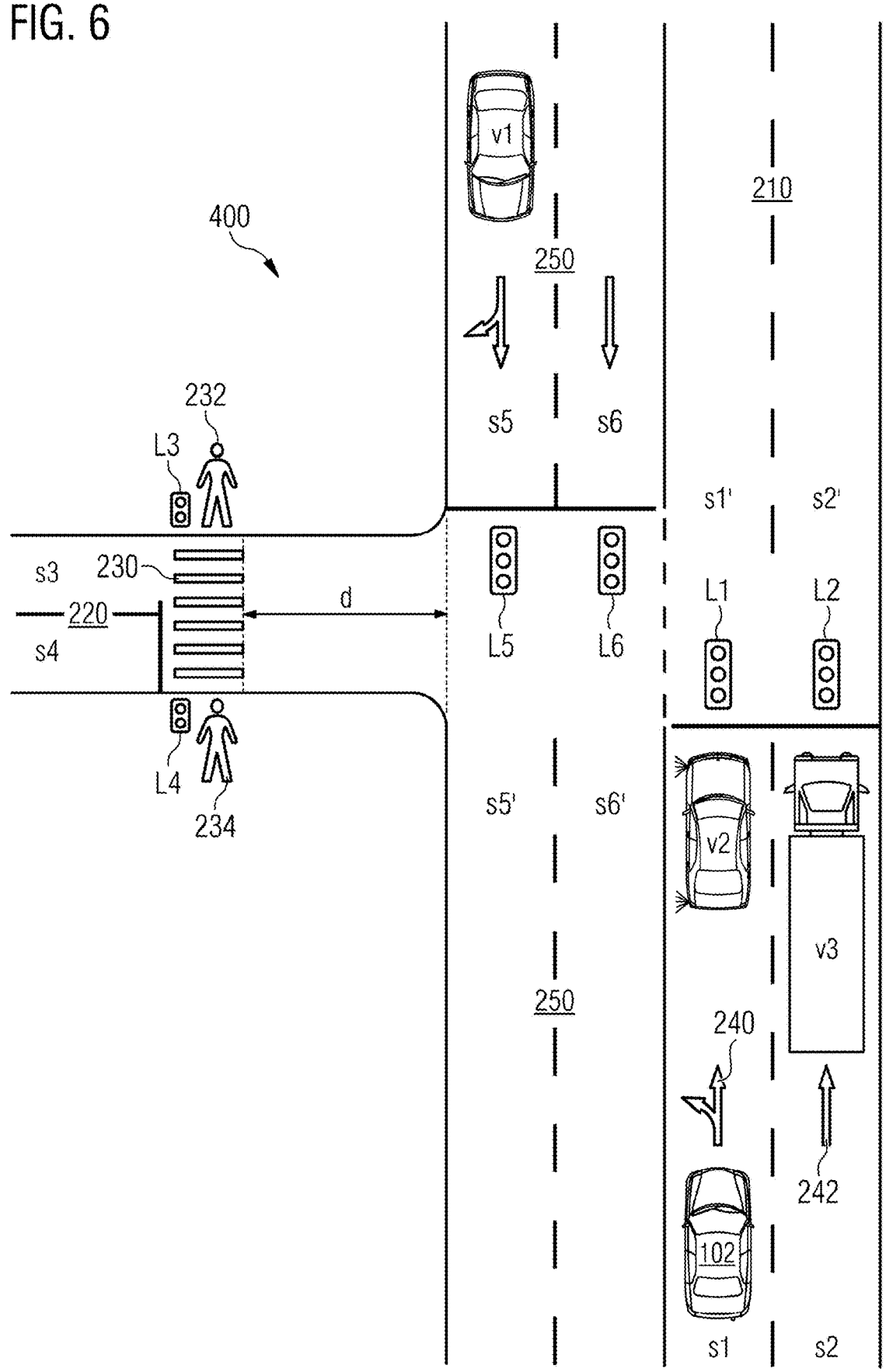
FIG. 6 shows a schematic representation of a third traffic network node having a fifth traffic situation with the vehicle.

FIG. 6 shows a schematic representation of a third traffic network node 400 having a fifth traffic situation with the vehicle 102. In contrast to the traffic network nodes 200 and 300, the third lane s3 branches off to the left from the first lane s1 at the traffic network node 400. Furthermore, a roadway 250 having the lanes s5, s5' and s6, s6' runs in the opposite direction to the lanes s1, s1' and s2, s2'. In order that a vehicle v2 can turn from the first lane s1 into the third lane s3, it therefore has to cross the roadway 250, i.e., the opposite roadway. In the traffic network node 400, a traffic signal L5 of the fifth lane s5 and a traffic signal L6 of the sixth lane s6 are additionally present. In the traffic situation shown in FIG. 6, the traffic signals L1 to L6 are all on red. The traffic signals L1 to L4 will subsequently switch to green essentially simultaneously. The traffic signals L5 and L6 remain on red, so that the vehicle v2 with intention to turn (turn signal) onto the third lane s3 does not have to wait for the oncoming traffic before the vehicle v2 can turn to the left. The vehicle v2 can therefore turn to the left onto the lane s3 immediately after the switching of the traffic signal L1 and stop in the area between crossing area 230 and the left lane edge of the lane s1 minus the width of the opposite roadway 250 having the relevant distance d in order to wait until all pedestrians 232, 234, after passing the crossing area 230, have left it again and the vehicle v2 can drive further along the lane s3, as can be seen in the sixth traffic situation shown in FIG. 7.

The following vehicle 102 (ego vehicle) is located on the second lane s2 behind a slowly accelerating and slowly driving truck v3. The control unit 116 determines a first delay time for the vehicle 102 at the traffic network node 400 with lane change to the lane s1 and a second delay time if the vehicle 102 remains on the second lane s2. Due to the slow truck v3 on the second lane, the second delay time is greater than the first delay time and the control unit 116 determines a lane change recommendation for the vehicle 102 from lane s2 to lane s1, which is output to the vehicle driver 104 or is transferred to a further control unit for autonomous or semiautonomous driving.

In other embodiments, the traffic signals L1 to L6 switch essentially simultaneously to green. The vehicle v2 therefore has to let the oncoming traffic, i.e., the vehicle v1, pass before turning to the left. Only then can the vehicle v2 turn and stop in the area between crossing area 230 and the left lane edge of the lane s1 minus the width of the opposite roadway 250 having the relevant distance d in order to wait until all pedestrians 232, 234, after passing the crossing area 230, have left it again. Only then can the vehicle v2 drive further along the lane s3.

Figure 7:
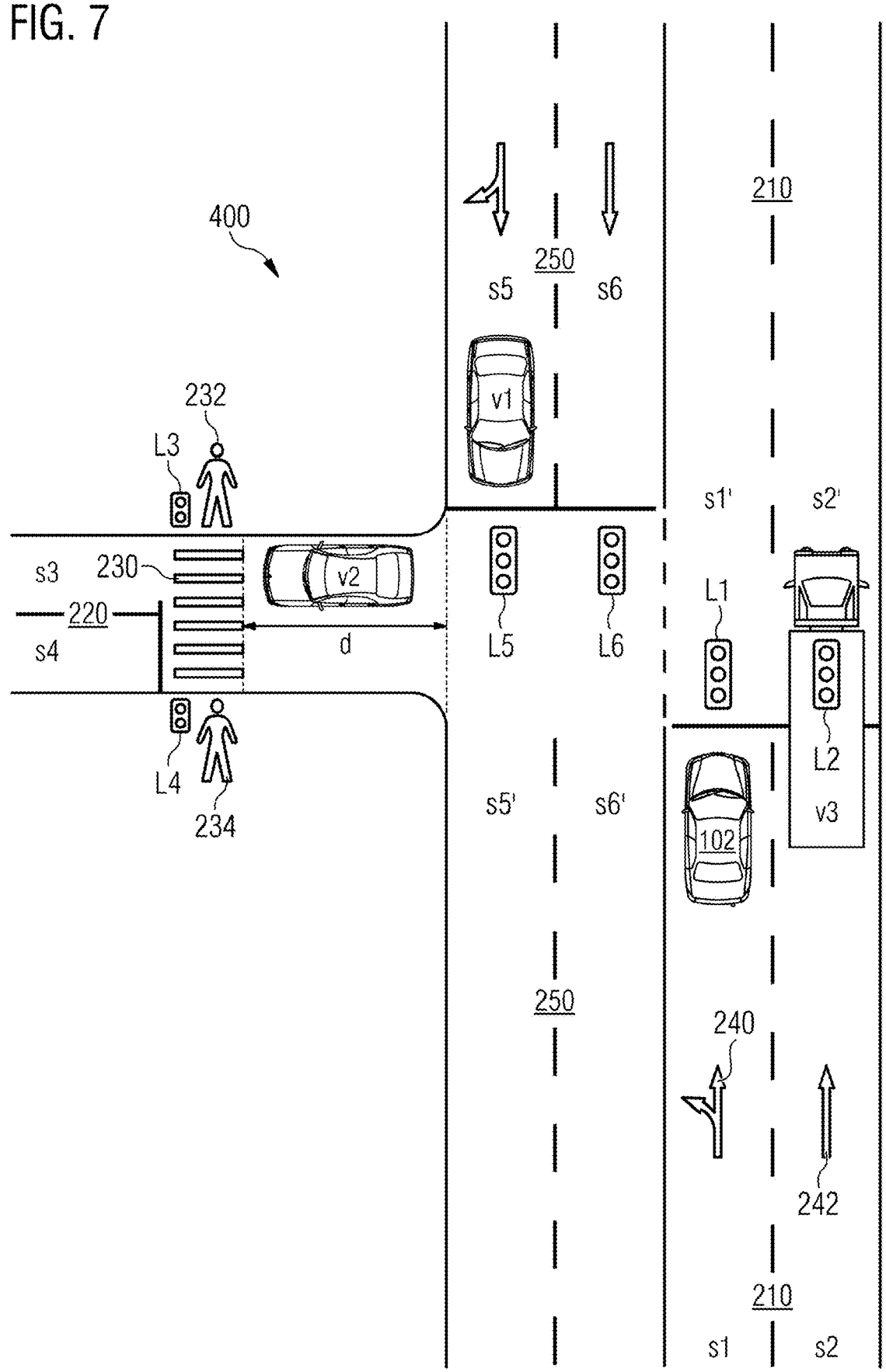
FIG. 7 shows the third traffic network node according to FIG. 6 having a subsequent sixth traffic situation.
Figure 8:
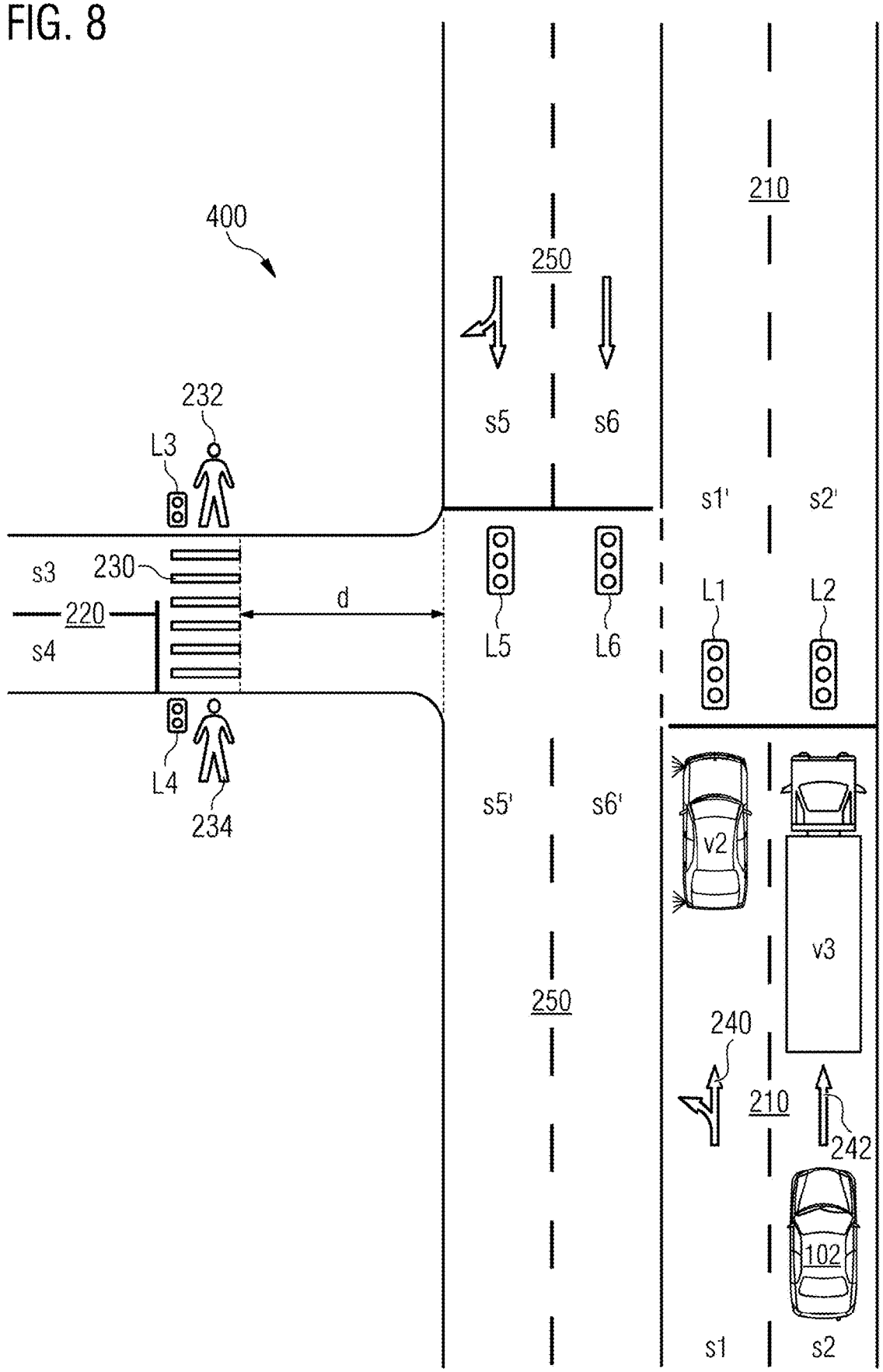
FIG. 8 shows a schematic representation of the third traffic network node having a sixth traffic situation with the vehicle.

FIG. 8 shows a schematic representation of the third traffic network node 400 having a seventh traffic situation with the vehicle 102, in which no oncoming traffic is present and all traffic signals L1 to L6 switch to green essentially simultaneously. Since no oncoming traffic is present, the vehicle v2 can immediately turn left and stop in the area having the relevant distance d before the crossing area 230 without obstructing other traffic, such as oncoming traffic subsequently coming on the lane s5. This is because the vehicle v2 does not protrude impermissibly into the fifth lane s5, as can be seen in FIG. 7. This is because the relevant distance d is greater than the length of the vehicle v2.

In all embodiments, the control unit 116 can receive the switching sequence or the switching protocol of the traffic signal system via the communication unit 118 via an infrastructure-to-car communication.

In the exemplary embodiments described on the basis of FIGS. 1 to 7, at least the control unit 116 forms the device 100 for determining a lane change recommendation for the vehicle 102. The control unit 116 is used as the processing unit of the vehicle 102, in particular as the data processing unit. Further elements and features shown in FIGS. 1 and 2 and mentioned in the preceding description can be part of the device 100. Method steps described on the basis of the device 100 can also be part of the method of the claimed invention.

LIST OF REFERENCE SIGNS 100 device
102, v1, v2, v3 vehicle
104 vehicle driver
106 surroundings recording unit
108 image recording unit
110 road user
112 navigation unit
114 occupant recording unit
116 control unit
118 communication unit
120 functional unit
122 display unit
124 input unit
200, 300,400 traffic situation
210,250 roadway
220 road
230 crossing area
232, 234 pedestrian
240, 242 directional arrow
L1, L2, L3, L4, L5, L6 traffic signal
s1, s2, s3, s4, s5, s6 lane

What is claimed is:

1. A device for determining a lane change recommendation for a vehicle, the device comprising:
a processing unit, which is configured to determine whether the vehicle is located on a road having at least one first lane running in a first direction and at least one second lane running in the first direction, wherein:
the processing unit is further configured to determine whether the first lane, at a traffic network node lying in front of the vehicle in a direction of travel, has a lane binding in the first direction and a second direction on a third lane,
the processing unit is further configured to determine whether the vehicle is located on the first lane or on the second lane,
the processing unit is further configured to determine whether the vehicle is to pass the traffic network node in the first direction, when it has been determined that the vehicle is located on the first lane, the processing unit is further configured to determine whether preceding and/or adjacent vehicles are present in an area between the vehicle and the traffic network node, the processing unit is further configured to determine an intention to turn of a preceding vehicle on the first lane into the third lane and a length of the preceding vehicle, and the processing unit is further configured to determine a lane change recommendation from the first lane to the second lane upon determining that the length of the preceding vehicle turning from the first lane into the third lane is longer than a relevant distance between a crossing area for pedestrians and/or bicyclists and the first lane running in the first direction via the traffic network node.

2. The device according to claim 1, further comprising:
at least one surroundings recording unit, which is configured to record at least one item of surroundings information related to the surroundings of the vehicle at least over an area in front of the vehicle in the direction of travel of the vehicle and to generate surroundings data corresponding to the surroundings information, wherein the processing unit is further configured to process the surroundings data.

3. The device according to claim 2, wherein the processing unit is further configured to detect, starting from the surroundings data, whether the vehicle is located on the first lane or the second lane.

4. The device according to claim 2, wherein:
the surroundings recording unit is a camera of the vehicle,
the camera takes at least one image having a depiction of the area in front of the vehicle and generates image data corresponding to the image, and
the processing unit is further configured to process the image data.

5. The device according to claim 1, wherein:
the processing unit is further configured to determine whether the crossing area for pedestrians and/or bicyclists at least for crossing the third lane is present at the traffic network node,
the processing unit is further configured to determine whether pedestrians and/or bicyclists are present at the crossing area, and
the processing unit is further configured to determine a lane change recommendation from the first lane to the second lane when pedestrians and/or bicyclists are present at the crossing area and it is determined that the length of the preceding vehicle turning from the first lane into the third lane is longer than the relevant distance between the crossing area and the first lane running in the first direction via the traffic network node.

6. The device according to claim 1, wherein:
the processing unit is further configured to determine an expected delay time on the first lane due to the preceding vehicle as a first delay time,
the processing unit is further configured to determine an expected delay time on the second lane as a second delay time and to determine the lane change recommendation only if the first delay time is greater than the second delay time.

7. The device according to claim 6, wherein the processing unit is further configured, when determining the first delay time and/or the second delay time, to determine a type, and/or the lane, and/or an intention to turn of determined preceding vehicles and take the type, the lane, and/or the intention to turn of the determined preceding vehicles into consideration in determining the respective delay time.

8. The device according to claim 6, wherein:
the processing unit is further configured to determine a presence of a traffic signal system at the traffic network node and to check whether at least one preceding vehicle has already come to a standstill at a red traffic signal and to determine a lane of the ate least one preceding vehicle, and/or the processing unit is further configured to determine speeds of preceding vehicles on at least two lanes, and
the processing unit takes into consideration a determined stationary vehicle or vehicles and/or the determined speeds of the preceding vehicles when determining the first delay time and/or the second delay time.

9. The device according to claim 1, wherein the processing unit is further configured to determine an intention to turn of each preceding vehicle on the first lane into the third lane and to determine a length of a vehicle having the intention to turn only if only one vehicle having the intention to turn has been determined.

10. The device according to claim 1, wherein:
the processing unit is further configured, in order to determine the length of the preceding vehicle, to determine a type of the preceding vehicle and to determine whether objects extending the length of the preceding vehicle are present, and
the length of the preceding vehicle is an overall length made up of the preceding vehicle and the extending objects.

11. The device according to claim 1, wherein:
the first lane is a right lane and the third lane branches off to the right at the traffic network node,
the second lane runs on the left next to the first lane, and
the processing unit is further configured to determine a distance between a right lane edge of the first lane and the crossing area.

12. The device according to claim 1, wherein:
the first lane is a left lane and the third lane branches off to the left at the traffic network node,
the second lane runs on the right next to the first lane, and
the processing unit is further configured to determine a distance between a left lane edge of the first lane and the crossing area.

13. The device according to claim 12, wherein a width of an opposite roadway is subtracted from the distance between the left lane edge of the first lane and the crossing area to determine the relevant distance between the first lane and the crossing area.

14. The device according to claim 13, wherein:
the processing unit is further configured to determine whether an oncoming vehicle is present on a lane of an opposite roadway and/or whether a traffic signal system at the traffic network node has the same traffic signals for the first lane and the second lane and for lanes oriented in an opposite direction, and
a distance between a left edge of the first lane and the crossing area, minus a width of an opposite roadway, is only determined as the distance between the edge of the first lane and the crossing area if no oncoming vehicle has been determined or if the traffic signal system at the traffic network node has different signals for the first lane and the second lane and for the lanes oriented in the opposite direction.

15. The device according to claim 1, wherein:
the processing unit is further configured to determine a speed and/or a possible acceleration of at least one further vehicle on the first lane from the vehicle or on the second lane in front of and/or next to the vehicle and take the speed and/or the possible acceleration into consideration in determining the lane change recommendation,
the processing unit determines, starting from the speed and/or the possible acceleration, a first delay time for the first lane and a second delay time for the second lane, and
the processing unit is further configured to determine the lane change recommendation only if the first delay time is greater than the second delay time.

16. A method for determining a lane change recommendation for a vehicle, the method comprising:
determining, by a processing unit, whether the vehicle is located on a road having at least one first lane running in a first direction and at least one second lane running in the first direction,
determining, by the processing unit, whether the first lane, at a traffic network node lying in front of the vehicle in a direction of travel, has a lane binding in the first direction and a second direction on a third lane,
determining, by the processing unit, whether the vehicle is located on the first lane or the second lane,
determining, by the processing unit, whether the vehicle is to pass the traffic network node in the first direction when it has been determined that the vehicle is located on the first lane,
determining, by the processing unit, the processing unit whether preceding vehicles are present in an area between the vehicle and the traffic network node,
determining, by the processing unit, an intention to turn of a preceding vehicle on the first lane into the third lane and a length of the preceding vehicle, and
determining, by the processing unit, a lane change recommendation from the first lane to the second lane upon determining that the length of the preceding vehicle turning from the first lane into the third lane is longer than a relevant distance between a crossing area for pedestrians and/or bicyclists and the first lane running in the first direction via the traffic network node.

* * * * *